US007881861B2

(12) United States Patent
Kravets et al.

(10) Patent No.: US 7,881,861 B2
(45) Date of Patent: Feb. 1, 2011

(54) NETWORKED NAVIGATION SYSTEM

(75) Inventors: Leonid Kravets, Philadelphia, PA (US);
Timothy H. Hwang, Philadelphia, PA (US)

(73) Assignee: Skypebble Associates LLC, Wilmington, DE (US)

( * ) Notice: Subject to any disclaimer, the term of this patent is extended or adjusted under 35 U.S.C. 154(b) by 37 days.

(21) Appl. No.: 12/200,096

(22) Filed: Aug. 28, 2008

(65) Prior Publication Data
US 2010/0057340 A1 Mar. 4, 2010

(51) Int. Cl.
*G01C 21/32* (2006.01)
(52) U.S. Cl. .................. 701/201; 701/210; 340/995.12
(58) Field of Classification Search ............... 701/208, 701/209, 210; 340/995.12, 995.13, 995.19
See application file for complete search history.

(56) References Cited

U.S. PATENT DOCUMENTS

| 5,610,821 | A | | 3/1997 | Gazis et al. | |
|---|---|---|---|---|---|
| 5,931,888 | A | * | 8/1999 | Hiyokawa | 701/208 |
| 6,240,364 | B1 | | 5/2001 | Kerner et al. | |
| 6,317,685 | B1 | * | 11/2001 | Kozak et al. | 701/210 |
| 6,385,542 | B1 | | 5/2002 | Millington | |
| 6,480,783 | B1 | * | 11/2002 | Myr | 701/117 |
| 6,577,949 | B1 | * | 6/2003 | Robinson et al. | 701/209 |
| 6,701,250 | B1 | * | 3/2004 | Rychlak | 701/210 |
| 6,965,325 | B2 | * | 11/2005 | Finnern | 340/995.23 |
| 7,463,972 | B2 | * | 12/2008 | Yamada et al. | 701/201 |
| 7,711,475 | B1 | * | 5/2010 | Cona et al. | 701/202 |
| 2001/0004725 | A1 | * | 6/2001 | Yagyu | 701/210 |
| 2003/0100326 | A1 | * | 5/2003 | Grube et al. | 455/515 |
| 2003/0191584 | A1 | * | 10/2003 | Robinson et al. | 701/209 |
| 2004/0073361 | A1 | * | 4/2004 | Tzamaloukas et al. | 701/210 |
| 2004/0172191 | A1 | * | 9/2004 | Vitikainen et al. | 701/208 |
| 2005/0015197 | A1 | * | 1/2005 | Ohtsuji et al. | 701/202 |
| 2005/0085997 | A1 | * | 4/2005 | Park | 701/209 |
| 2005/0288849 | A1 | * | 12/2005 | Rothman et al. | 701/117 |
| 2006/0015249 | A1 | * | 1/2006 | Gieseke | 701/210 |
| 2006/0069501 | A1 | * | 3/2006 | Jung et al. | 701/209 |
| 2007/0073480 | A1 | * | 3/2007 | Singh | 701/211 |

(Continued)

FOREIGN PATENT DOCUMENTS

WO    WO02/33355    4/2002

OTHER PUBLICATIONS

"Personalized and Adaptive Services on Board a Car: An application for Tourist Information" in Journal of Intelligent Information Systems, 21:3, 249-284, 2003.

(Continued)

*Primary Examiner*—Khoi Tran
*Assistant Examiner*—Brian J Broadhead
(74) *Attorney, Agent, or Firm*—Carlineo, Spicer & Kee, LLC

(57) ABSTRACT

A method of providing alternate route possibilities to a first vehicle operator using a first networked navigation device includes determining a first route between a starting position and a travel destination. An alternate route request is transmitted to a second networked navigation device for a portion of the route between the starting position and the travel destination. The alternate route is received from the second navigation device. The determined first route and the received alternate route are presented to the first vehicle operator, including usage data for the alternate route.

23 Claims, 6 Drawing Sheets

U.S. PATENT DOCUMENTS

| | | | |
|---|---|---|---|
| 2007/0088494 A1* | 4/2007 | Rothman et al. | 701/200 |
| 2007/0168118 A1* | 7/2007 | Lappe et al. | 701/207 |
| 2007/0294031 A1* | 12/2007 | Brinton et al. | 701/209 |
| 2008/0051993 A1* | 2/2008 | Graham et al. | 701/209 |
| 2008/0059064 A1* | 3/2008 | Werner et al. | 701/211 |
| 2008/0077309 A1* | 3/2008 | Cobbold | 701/117 |
| 2008/0082264 A1* | 4/2008 | Hill et al. | 701/213 |
| 2008/0103688 A1* | 5/2008 | Chess et al. | 701/202 |
| 2008/0114543 A1* | 5/2008 | Vishnu | 701/209 |
| 2008/0195313 A1* | 8/2008 | Coleman | 701/210 |
| 2008/0294337 A1* | 11/2008 | Dawson et al. | 701/209 |
| 2008/0319661 A1* | 12/2008 | Werner et al. | 701/211 |
| 2008/0320084 A1* | 12/2008 | Godon et al. | 709/205 |
| 2009/0005018 A1* | 1/2009 | Forstall et al. | 455/414.1 |
| 2009/0005964 A1* | 1/2009 | Forstall et al. | 701/201 |
| 2009/0088971 A1* | 4/2009 | Currie et al. | 701/209 |
| 2009/0157312 A1* | 6/2009 | Black et al. | 701/210 |
| 2009/0177386 A1* | 7/2009 | Haase | 701/209 |
| 2009/0182498 A1* | 7/2009 | Seymour | 701/201 |
| 2009/0282124 A1* | 11/2009 | Rauhala et al. | 709/216 |
| 2009/0319172 A1* | 12/2009 | Almeida et al. | 701/201 |
| 2010/0042427 A1* | 2/2010 | Graham et al. | 705/1 |
| 2010/0057340 A1* | 3/2010 | Kravets et al. | 701/201 |

OTHER PUBLICATIONS

Traffimatics—intelligent co-operative vehicle highway systems. Jan. 21, 2008.

SINTEF—Cooperative Vehicle Infrastructire System, accessed at <http://www.sintef.no/content/page1_12211.aspx> on Jan. 21, 2008.

Dash Express product information, accessed at <http://dash.net/product.php> on Jan. 22, 2008.

Open Source GPS How To, accessed at <http://www.marengo-ltd.com/gps> Jan. 18, 2008.

* cited by examiner

NETWORKED NAVIGATION SYSTEM

CROSS REFERENCE TO RELATED APPLICATIONS

This application is related to co-pending U.S. patent application Ser. No. 12/200,077, filed Aug. 28, 2008, entitled Intelligent Travel Routing System and Method.

BRIEF DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

In the Drawings.

DETAILED DESCRIPTION

Figure 1:
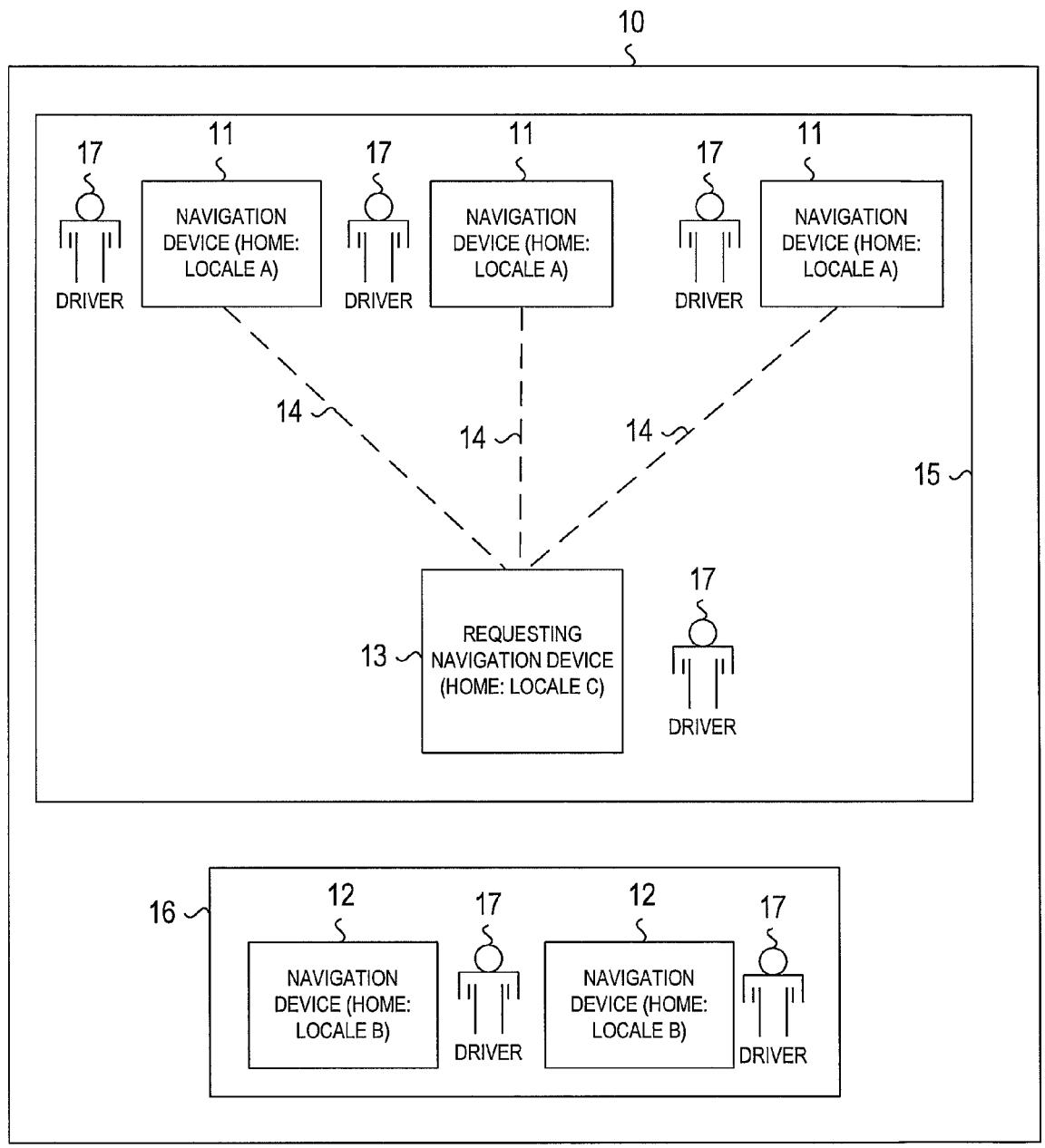
FIG. 1 is a system diagram of a networked navigation system in accordance with a first embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments of the present disclosure, but do not constrain implementation thereof to any particular hardware or software embodiments. Unless otherwise noted, the notation used with respect to the UML diagrams contained herein is consistent with the UML 2.0 specification or variants thereof and is understood by those skilled in the art.

This disclosure is drawn, inter alia, to methods, apparatus, computer programs and systems related to navigation systems. The networked navigation system described herein allows sharing of personal routes, including favorite shortcuts and uncommon alternate routes among and between users, including but not limited to drivers, hikers, runners and boaters. After experiencing a particular area for a period of time, a person may acquire knowledge about local roads and their desired, most efficient, preferred and/or optimal use. Certain local roads may often be congested, under construction, or prone to accidents. Though some navigation devices provide traffic updates for larger roads, they typically do not account for roads in residential areas and thus are less reliable in such circumstances. A navigation device associated with a local driver may be utilized to store route data for a locale as roads in that locale are traversed by the driver. The local route data may be compiled, analyzed and upon request, provided to other navigation devices of drivers unfamiliar with the locale.

Referring to the drawings in detail, wherein like numerals indicate like elements throughout, there is shown in FIGS. 1-6 various embodiments of a networked navigation system for sharing preferred route information. In one embodiment, referring to FIG. 1, the networked navigation system 10 includes one or more navigation devices 11, 12 in a first locale 15 and a second locale 16, respectively. The navigation devices 11 have the first locale 15, or location "A", as their home locale. The navigation devices 12 have the second locale 16, or location "B", as their home locale. A requesting navigation device 13 may traverse or travel within the first locale 15, but has a third locale, location "C", (not shown) as its home locale. The requesting navigation device 13 is configured to request, via a wireless communication link 14, alternate routes while traversing the first locale 15 from navigation devices 11 having the first locale 15 as their home locale. In addition to being associated with a particular locale, each of the navigation devices 11, 12, 13 may be associated with one or more drivers or operators 17 that operate the vehicles corresponding to the respective navigation device or that otherwise interact with the navigation device.

The navigation devices 11, 12, 13 may be any device generally known in the art having a display for presenting map, position and/or routing data and an input means (e.g., GUI, keypad, touch-screen) for interacting with a user, and adapted for sharing route information. The device may be a standalone unit or may be mounted in an automobile's dash board. Alternatively, the navigation device may be built into a mobile device such as a cellular phone, personal digital assistant (PDA) or laptop. The device may determine position (e.g., present estimated or actual location) using one or more of a satellite system such as the Global Positioning System (GPS), cell triangulation, compass, inertial sensor or any other positioning method generally known in the art. A detailed discussion of navigation devices is omitted here for convenience only and should not be considered limiting.

The navigation devices 11, 12, 13 may connect directly with other navigation devices via a peer-to-peer protocol. Such a scheme may require the requesting device to locate other devices within a reasonably close geographic proximity. The peer-to-peer approach allows the requesting device to receive any available routes directly from one or more navigation devices capable of providing the requested route data.

Figure 6:
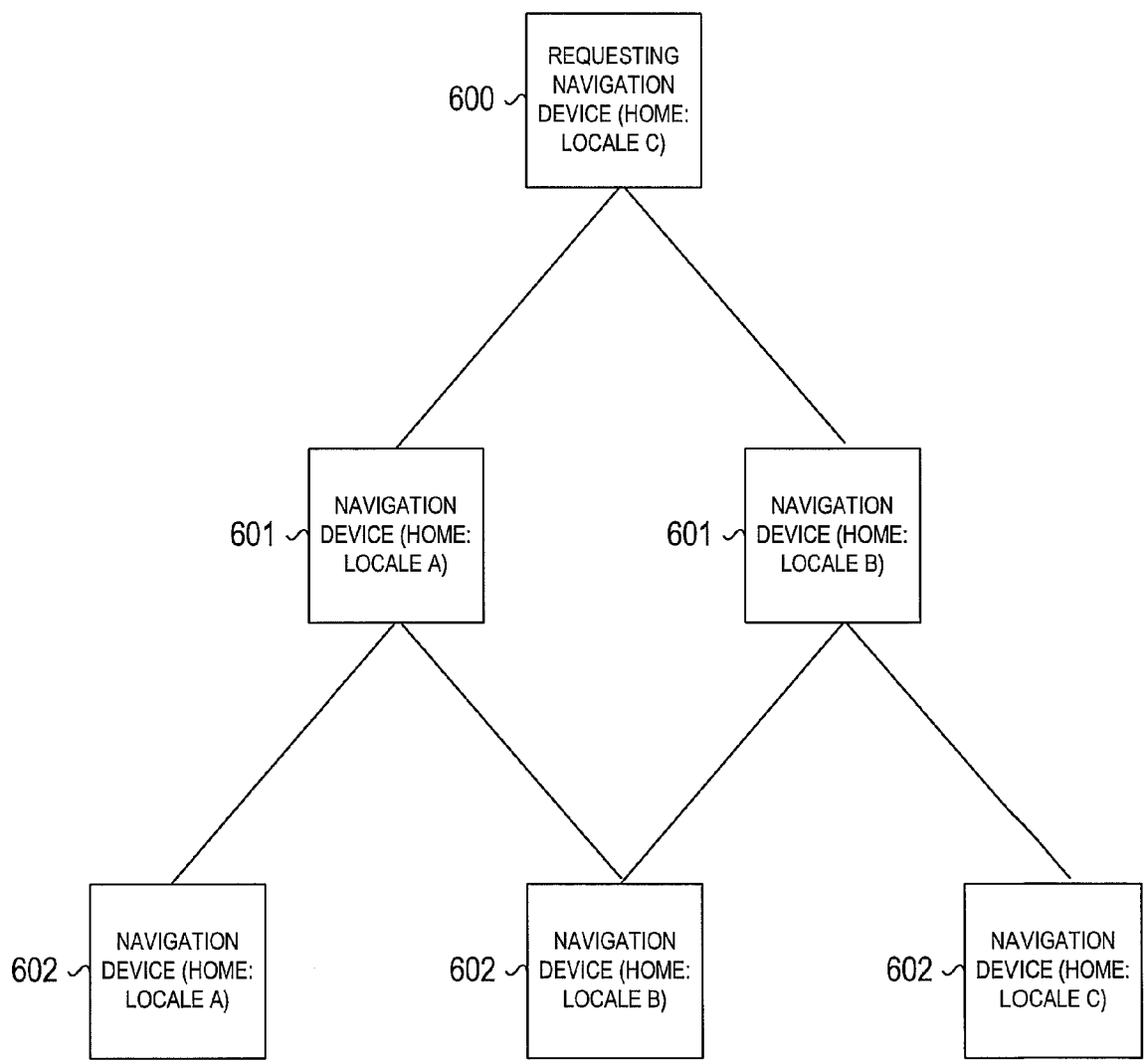
FIG. 6 is a block diagram of a networked navigation system in accordance with a third embodiment.

Alternatively, referring to FIG. 6, the requesting device 600 may broadcast a "request route" message to one or more first receiving navigation devices 601 within a geographical proximity. Upon receipt, each of the first receiving navigation devices 601 may determine if an alternate route as requested is available, and if not, the first receiving navigation devices 601 may forward the request to additional second navigation devices 602. Note that the locale of the first and second navigation devices 601, 602 may be the same or may be different from the requesting navigation device 600 and from each other. The request may be propagated among multiple navigation devices within or external to the initial geographical area until a suitable route is found and forwarded to the requesting device, either directly or via the intermediate navigation devices.

Communications link 14 may be any type of wireless link between the requesting navigation device 13 and local device 11. The connections may be maintained via wireless vehicle to vehicle protocol Wi-Fi 802.11p—Wireless Access for the Vehicular Environment (WAVE). The navigation devices may be connected via a peer to peer protocol for direct sharing of routes with nearby vehicles. Alternatively, the route sharing protocol may be built based upon the Bit Torrent protocol. A tracker may determine the available navigation devices and facilitate connections between the requesting devices and the local devices with alternate route data.

Figure 2:
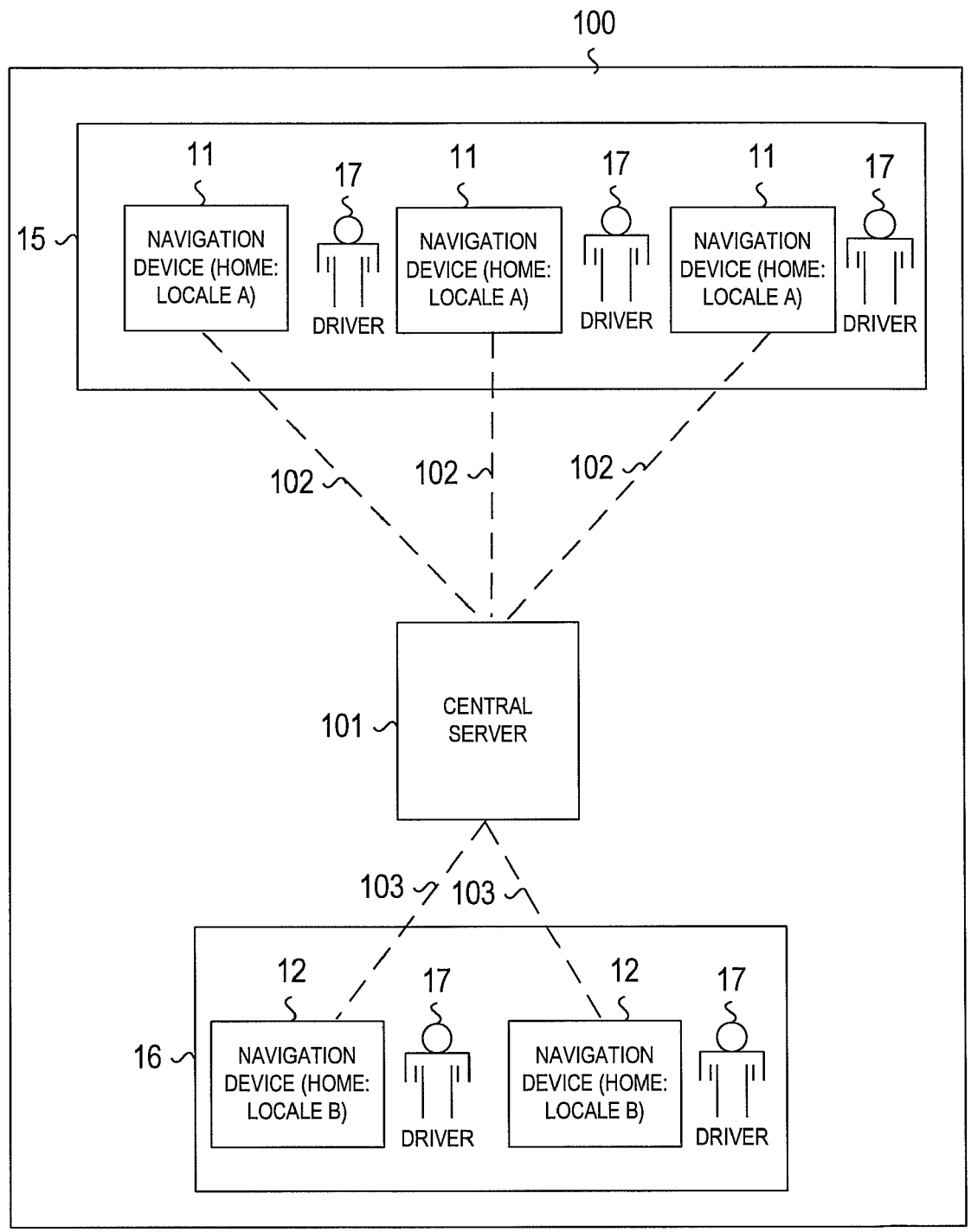
FIG. 2 is a system diagram of a networked navigation system in accordance with a second embodiment.

Referring to FIG. 2, in a second embodiment, the networked navigation system 100 includes navigation devices 11, 12 at locales 15, 16 similar to those described with respect to FIG. 1. The networked navigation system 100 includes a central server 101 that communicates with the navigation devices 11 at the first locale 15 via communication links 102. The navigation devices 12 at the second locale 16 are connected to central server 101 via communication links 103. A requesting navigation device (not shown) traversing or traveling within the first locale 15 or the second locale 16 may query the central server 101 to receive alternate route data for the locale being traversed. Communications links 102, 103 may be any wireless communications link capable of transmitting data from the navigation devices 11, 12 to central server 101, such as wireless vehicle to vehicle protocol Wi-Fi 802.11p.

The central server 101 stores route preference data provided by multiple navigation devices 11, 12 and/or stores information about local navigation devices capable of providing alternate route data. If the central server 101 directly stores alternate route data, the requesting device may forego searching single navigation devices for an alternate route. The data in the central server 101 may be used to compile an alternate route to be provided to the requesting navigation device directly from the central server 101. If the central server 101 stores information about local navigation devices, the requesting navigation device may contact the central server 101 to request a connection to a navigation device capable of providing alternate route data for the given locale. The request may contain an origin and destination for the requested alternate route, which the central server 101 may use to locate navigation devices capable of providing an alternate route. The located navigation devices should preferably have a home locale in or near the geographical area between the origin and destination. Once such navigation devices are found, the central server 101 may facilitate a connection for transferring the alternate route.

Still referring to FIG. 2, the central server 101 also receives alternate route data from navigation devices in all locales. Alternatively, each locale may have a regional server (not shown) responsible for providing routing data to devices within the locale at any given time. Thus, a navigation device's home locale may be registered via a connection to a regional server responsible for storing alternate route data and providing alternate routes to a requesting navigation device. The regional server's locale may be preset or may have dynamic boundaries that are adjusted depending on the route data stored in the regional server or navigation devices registered with the regional server.

Referring again generally to FIGS. 1 and 2, in addition to providing map, position and route data for an individual driver 17, the navigation devices 11, 12, 13 analyze the passive and active observations along with manually input route and other to determine a set of route preferences for the driver or drivers associated with that device. For example, the device may determine that certain road segments are traveled with greater frequency during specific hours or that a particular destination is reached via different roads depending on the time that travel occurs. Such route preference data may be compiled and stored in the navigation device as roads are traversed. The route preference data may include information about component route segments, such as frequency of use of the component road segments or route, the average time of travel and the average speed.

The route preference data may be prioritized based on the home locale associated with each of the navigation devices 11, 12, 13. The personalized home locale for each navigation device may be determined by analyzing the stored route preference data for each locale and may be based on a set area containing the most distance driven, the most time spent or the presence of the navigation device at a given location at a selected time. Alternatively, preset locales may be created dynamically or statically by a locale organizer and navigation devices may be placed into the preset locales. Thus, a locale may be a unique geographic point on a map, a geographic area having preset boundaries or a unique set of boundaries for each navigation device. Additionally, the home locale may be updated to a different geographic area based on criteria such as a day of the week or time of year. For example, for a driver having a residence in Pennsylvania during the spring and summer and in Florida during fall and winter, the home locale may be selected based on the season. Alternatively, the device may have more than one home locale such that the navigation device may provide alternate route data for requests from navigation devices in more than one locale.

When a route consists of multiple road segments, it may be recorded as a complete route or may be broken down into the component road segments or combinations of road segments. When stored as a complete route, the entire route may be made available in response to a request for alternate routes or alternatively the component road segments may be separated and provided in response to the request. Optionally, certain component road segments of the route may be ignored, for example the device may choose to ignore access roads near an origin or destination address.

In order to compile route preference data, a navigation device may be configured to automatically track routes and/or road segments traveled by the associated vehicle and to record metadata about the routes and statistics about the routes traveled, including starting point and destination, time of travel, duration of travel, roads used, average speed and number of stops. Such tracking may also be performed in a passive state (e.g., when the device is not actively providing directions to the driver). Those skilled in the art, in light of the present disclosure, will recognize additional data points that the navigation device could store about a particular route. The statistics may be compiled or stored individually; they may also be broken down to the component road segments associated with the traversed route.

To augment the route preference data (whether recorded actively or passively), a navigation device may record instances when the driver does not follow the directions provided by the navigation device. For example, when the driver avoids certain roads recommended by the navigation device on multiple occasions, the device may collect the route preference in memory and adjust its routing algorithms to incorporate recommending the route chosen by the driver on future trips. Such instances, especially when near the origin of the route, may show the driver has a preference for an alternate route from the one presented by the navigation device. The navigation device may continue monitoring the route taken by the driver to determine whether the driver follows the rest of the directions as provided by the device.

Additionally, a driver may manually input routes or other data to be saved to the navigation device and optionally shared upon request. To assist in inputting such a route, the navigation device may create a log of road segments traveled by the driver. The driver may browse the list of road segments, select one or more such segments and create a route. The created route may be tagged with a name. Alternatively, the driver may create a route by selecting road segments on a map. The created route may be tagged with a name and stored in memory of the navigation device or uploaded to a server. As an example, one such route may be tagged "Home to I-95" and would include road segments taking the driver from a primary residence to the entrance ramp of Interstate 95 via the driver's preferred route. When requesting directions to a particular destination in the future, the driver may select the "Home to I-95" tag and the navigation device will include the road segments identified by the tag in creating a route to the destination.

Depending on the particular embodiment employed, the stored route preference data may optionally be provided to the central server 101 for further analysis (see FIG. 2). The central server 101 may receive data from multiple navigation devices from various locales, in which case multiple navigation devices may provide data for each locale. The central server 101 may pool route data received from the multiple navigation devices in order to create a master database of local route preference data. Route preference data from all navigation devices in a single locale may be pooled to create a route preference database for the locale. Prior to placing route preference data from a navigation device into a master database, the central server 101 may remove routes or road segments that it determines are insignificant. For example, routes that are infrequently traveled or routes that take significantly longer than the predicted time based on a calculated route may be removed. Additionally, the central server 101 may check for points of interest present along a route. Frequent stops at the same or similar location by multiple parties may represent such a point of interest. The central server 101 may add such points of interest to the route. The preferences may be stored on the central server 101 based on the present or dynamic home locale, particular neighborhood, zip code or sets of roads. The stored data can be made available to a navigation device upon request.

In one embodiment the requesting navigation device 13 requests information about road segments along a route without requesting an alternate route. The responding devices may provide metadata to be used by the requesting device in calculating a path. For example, the metadata provided may include average speed along a particular street, traffic conditions along the street, points of interest or areas under construction. The navigation device may use the metadata when building a route by avoiding or including the particular road segments.

Information may be shared with a requesting navigation device on a single-use basis, such as when a requesting device broadcasts a route request to other devices within range of the requesting device or to a central server storing route preference data for the locale. For example, if the requesting device is seeking a time-saving detour, a request to route to a particular destination within the locale may be transmitted. In response, a route having a set of road segments may be received along with contextual information describing the route. Contextual information may include the number of times the alternate route has been driven, the number of drivers selecting the alternate route, the distance of the alternate route, the average speed on the alternate route and the average time spent traversing the route. The driver may review the contextual information in order to determine whether to accept the suggested alternate route.

In certain situations, temporary groups of navigation devices may be created for devices of drivers unfamiliar with an area and requesting alternate routes from other navigation devices. Referring to FIG. 1, a temporary group may include the requesting navigation device 13 and navigation devices 11 having first locale 15 as the home locale. A temporary group may be anonymous, protecting the identity of all parties involved and may require consent to be given prior to access being granted to the requesting device. The temporary group may be facilitated by a remote server or may be a result of a direct connection between the requesting and local devices. The requesting device may receive permission to access a route database of another navigation device or alternatively may receive a suggestion of an alternate route from a remote route server, taking into account information available from the local navigation devices.

Alternatively, information may be shared within groups of trusted navigation devices. Referring to FIG. 2, a group may include all devices having first locale 15 as the home locale. A navigation device belonging to the group may access the route information and route history of other navigation devices belonging to the same group via the networked navigation devices. Thus, a group may include two or more navigation devices belonging to distinct drivers.

Navigation device groups may also be of a permanent or standing nature, such as those for friends and family, thereby allowing viewing routes of the group by all members. Such permanent or standing groups may be automatically or manually generated and may be modified, as when members join or leave the group. Groups may also be based on neighborhood, zip code or street of residence. Those skilled in the art, in light of the present disclosure, will recognize other criteria for creating permanent or standing groups. Membership in a permanent or standing group may allow for downloading route preference data sets compiled from other group members. Such data sets may be provided as updates to a navigation device periodically such that each device in the home locale may contain updated route preference data.

Figure 3:
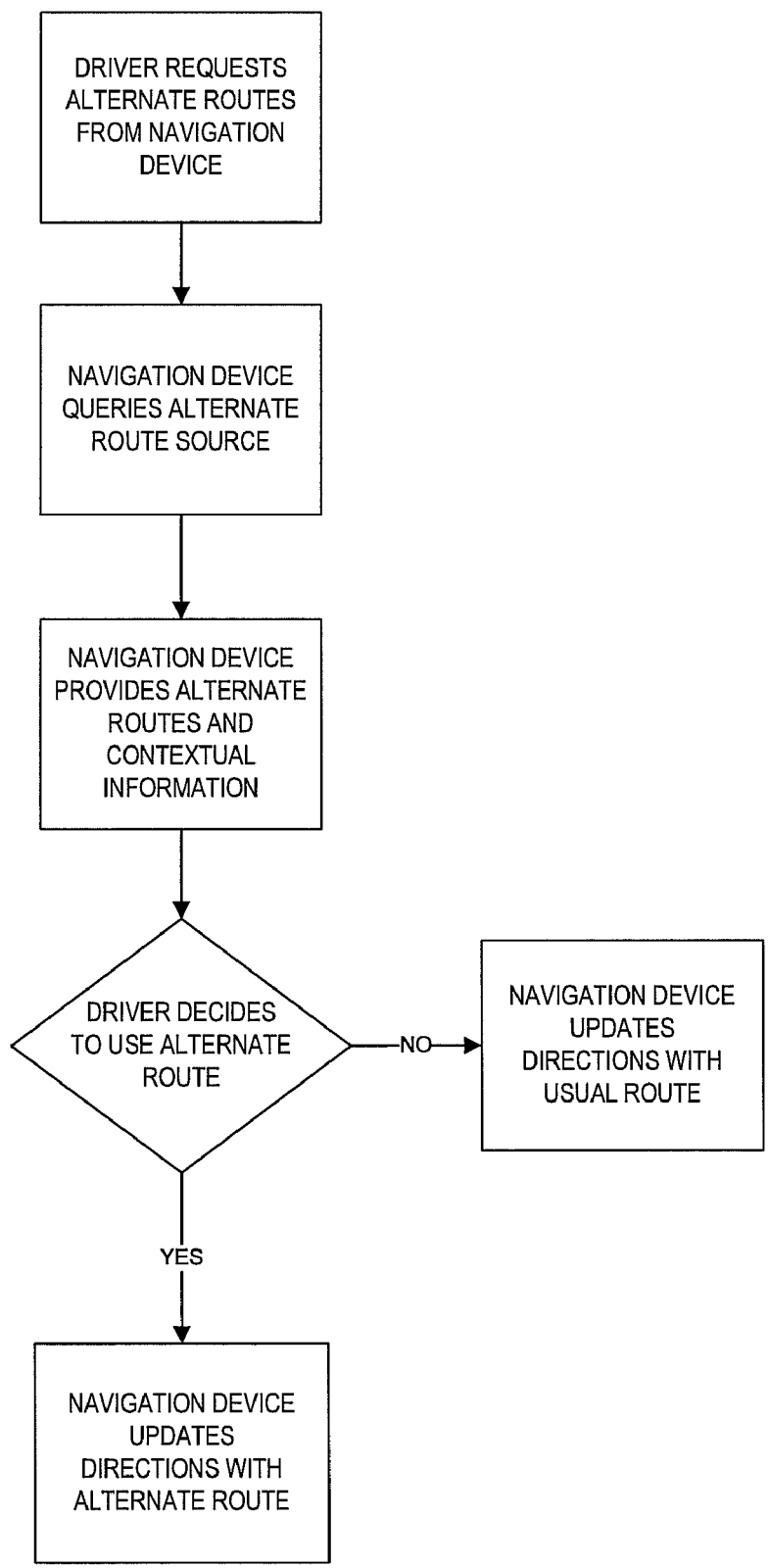
FIG. 3 is a flowchart of delivering an alternate route to a driver in accordance with one embodiment.

Referring to FIG. 3, a flow chart is shown for obtaining alternative route data from a trusted source in a networked navigation device group, including utilization of contextual information about alternate routes. The contextual information may include preferred time of day or day of the week for using an alternate route. Special circumstances may also be taken into consideration, such as unusual routes taken at very heavily traveled times, for example, rush hour or holiday travel. The contextual information provides a basis for making an intelligent selection by the requesting driver of the alternate routes over the route suggested by the navigation device. The navigation device or driver requesting the route can view the alternate routes obtained from their trusted sources, along with the contextual information, and may choose between the route calculated by the navigation system's routing software and the provided alternate routes.

Figure 4:
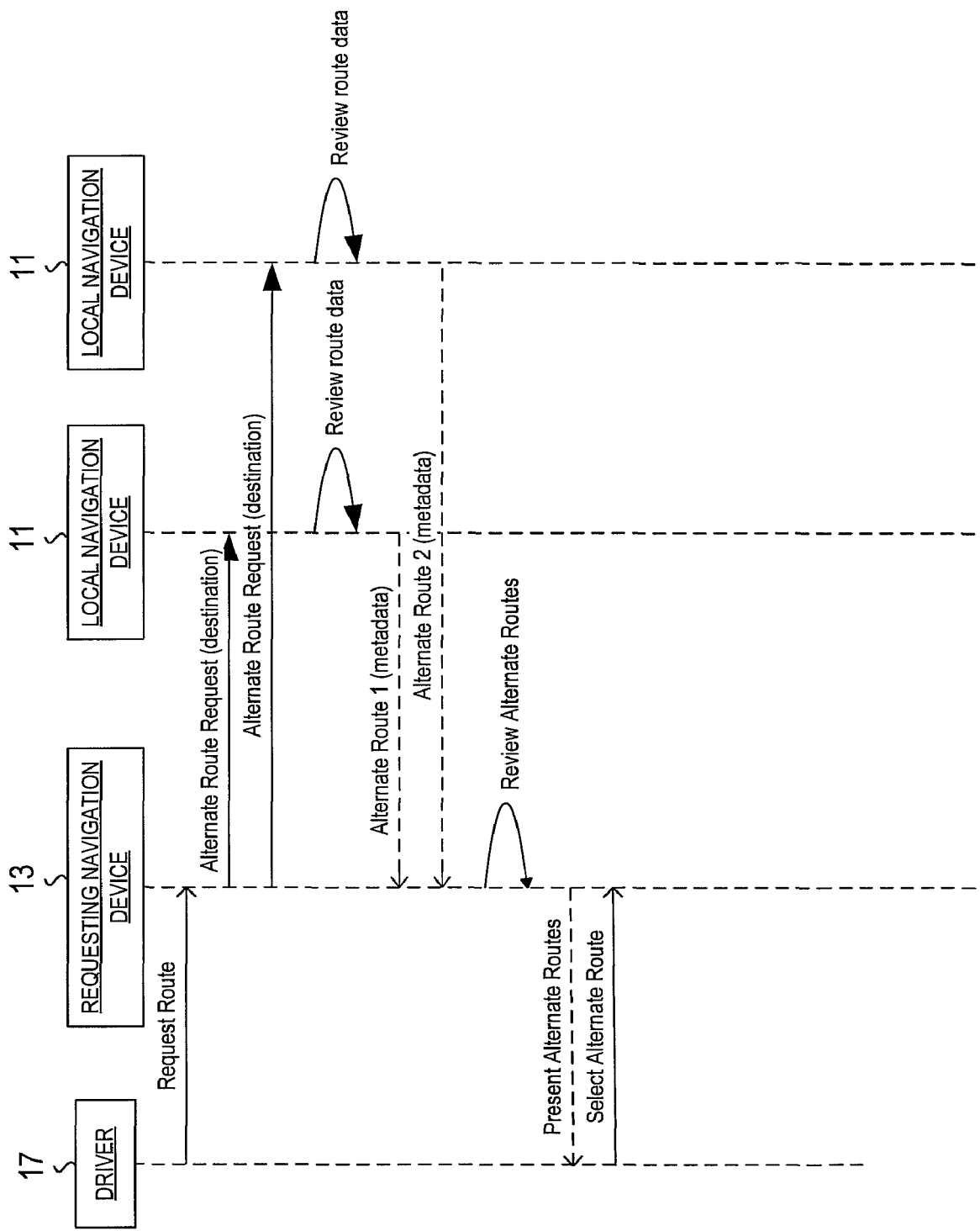
FIG. 4 is a sequence diagram showing communications for selecting an alternate route in accordance with the networked navigation system of FIG. 1.

Referring to FIG. 4, when a driver 17 interfaces with a requesting navigation device 13 to obtain a route, the requesting navigation device 13 determines whether to request alternate routes. Requesting navigation device 13 may decide alternate routes should be requested as a result of input by the associated driver or because of an unsatisfactory calculation of a route using internal routing mechanisms. Additionally, the requesting device may determine an alternate route is needed if it determines that the available maps are out of date or inaccurate for an area being navigated. Other road conditions, such as road construction, closures or heavy traffic could result in the requesting device determining an alternate route is needed. If the requesting navigation device 13 determines alternate routes should be requested, it attempts to locate local navigation devices 11. Alternate route requests are transmitted from requesting navigation device 13 to local navigation devices 11 via the communications link 14. Upon receiving the request, the local navigation device 11 reviews stored route data and determines whether an alternate route should be created. If an alternate route is created, the local navigation device 11 compiles and provides the alternate route back to the requesting navigation device 13. The requesting device reviews the alternate routes and presents them to the driver 17 along with metadata provided with the route. The driver 17 may select between the route calculated by the requesting navigation device 13 and the received alternate routes for routing to begin.

Figure 5:
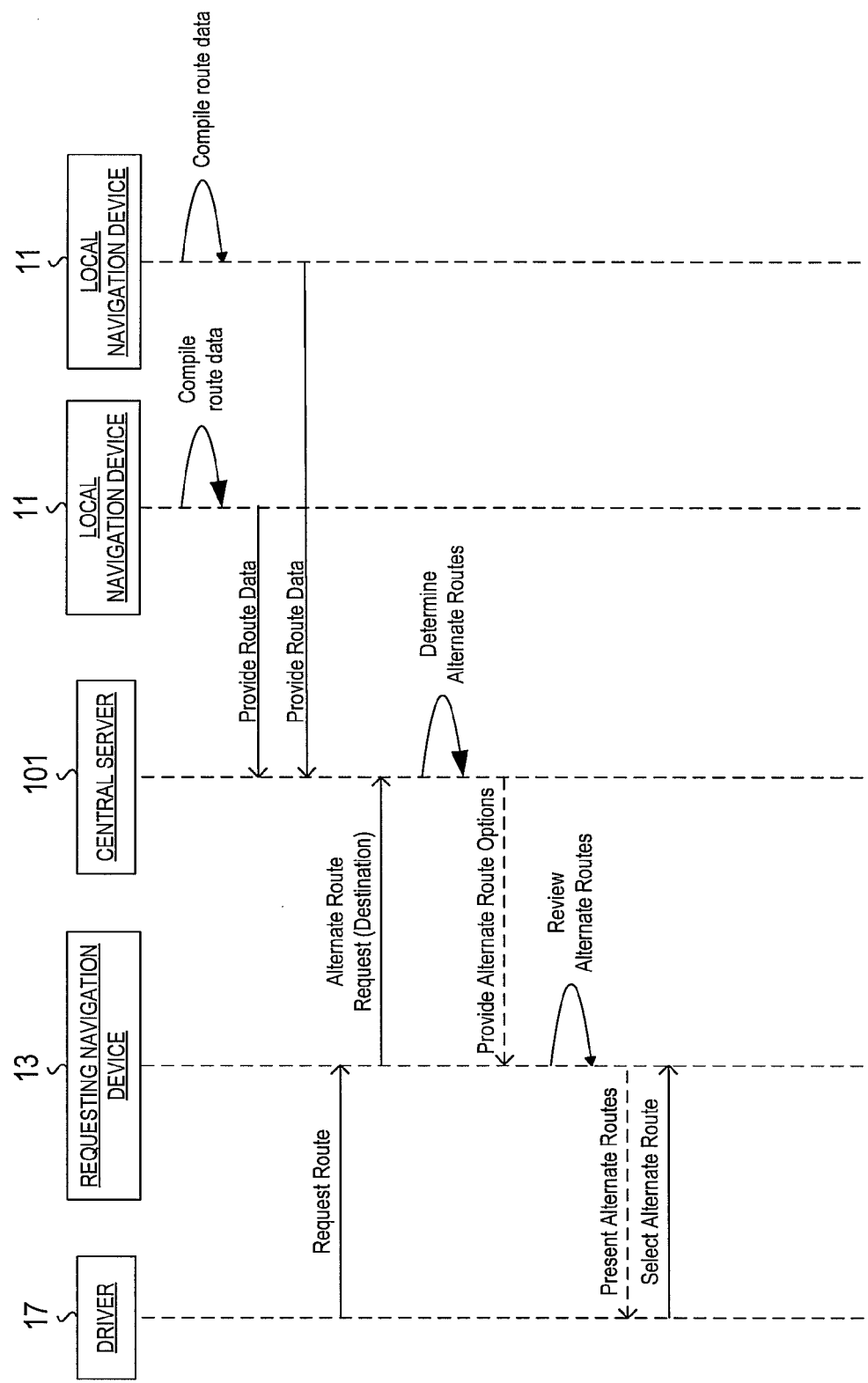
FIG. 5 is a sequence diagram showing communications for selecting an alternate route in accordance with the networked navigation system of FIG. 2.

Referring to FIG. 5, the navigation devices 11, 12, 13 may be connected to a central server 101, allowing for stored routes to be shared between devices out of range of direct communication. The connection with the central server 101 may be established via a wireless protocol such as WiFi or WiMAX or via the cellular network. Those skilled in the art, in light of the present disclosure, will readily understand and realize additional methods of establishing a connection between a navigation device and a central server 101. In this architecture, the central server 101 may collect routes from local navigation devices and determine which routes to provide to a requesting device or the central server 101 may receive a route request and determine whether any local navigation device may have alternate route data for the route request.

Still referring to FIG. 5, the central server 101 compiles route data from local navigation devices 11. When the driver 17 requests a route from a requesting navigation device 13, the device sends out an alternate route request to the central server 101. The central server 101 determines potential alternate routes and presents the alternate route options back to the requesting navigation device 13. The alternate routes may contain metadata related to the route options. Upon receipt, requesting navigation device 13 presents alternate route options to the driver 17. The driver 17 may review the routes and select a route for routing.

Upon receiving the alternate route data, the requesting navigation device 13 displays route options to the driver 300. Metadata provided with the route choices may assist the driver in selecting from the displayed routes. Such metadata may include (1) frequency of use of the route, (2) average driving time, (3) number of times driver changed directions in-route, (4) average speed of travel, (5) percentage of times the actual driving time was less than or equal to the expected driving time, and (6) percentage of times the actual driving time was greater than the expected driving time. Those skilled in the art, in light of the present disclosure, will recognize various other metadata for assisting a driver in selecting a route.

After an alternate route is selected, the requesting navigation device 13 may store the route details and record metadata pertaining to the route as it is followed. For example, the device may record the amount of time the driver spent traveling along the alternate route or whether any wrong turns were taken. This data may be transmitted back to the route provider (i.e., the navigation device 11, 12 or the central server) for storage and/ore refinement. Additionally, the driver may be requested to provide feedback about the alternate route. The driver may rate the alternate route based on criteria such as difficulty of directions, drivability of roads, amount of traffic, speed and length of route. This data may be used to improve available alternate routes and may be provided to other drivers along with the route details when deciding whether to select the alternate route.

The embodiments of the present disclosure may be implemented with any combination of hardware and software. If implemented as a computer-implemented apparatus, embodiments of the present disclosure are implemented using means for performing all of the steps and functions described above.

The embodiments of the present disclosure can be included in an article of manufacture (e.g., one or more computer program products) having, for instance, computer useable media. The media has embodied therein, for instance, computer readable program code means for providing and facilitating the mechanisms of the present disclosure. The article of manufacture can be included as part of a computer system or sold separately.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of providing alternate route possibilities between a starting position and a travel destination to a first vehicle operator using a first networked navigation device from at least one second networked navigation device, the method comprising:
 determining a first route between the starting position and the travel destination;
 transmitting an alternate route request to the at least one second networked navigation device for at least a portion of the first route between the starting position and the travel destination, the at least one second networked navigation device having an assigned or determined home locale;
receiving at least one alternate route from the at least one second networked navigation device; and
presenting the determined first route and the received at least one alternate route to the first vehicle operator, wherein the presenting includes usage data for the at least one alternate route.

2. The method of claim 1, wherein the first networked navigation device and the at least one second networked navigation device are members of a standing group for sharing route preference data.

3. The method of claim 1, further comprising:
receiving, from the first vehicle operator, a selection of one of the at least one alternate routes;
storing the selected alternate route; and
providing the stored route to another networked navigation device requesting travel routes in the proximity of the starting position and the travel destination.

4. The method of claim 1, wherein the usage data provides the first vehicle operator with a comparative gauge for selecting one of the at least one alternate routes instead of the first route.

5. The method of claim 1, wherein the first networked navigation device and the at least one second networked navigation device are connected by a peer-to-peer communication.

6. The method of claim 5, wherein the peer-to-peer communication is facilitated by a central server.

7. The method of claim 1, further comprising:
automatically selecting an alternate route based on the usage data.

8. The method of claim 7, wherein selecting the alternate route is based at least in part on a frequency of use of the alternate route by a second vehicle operator.

9. The method of claim 7, wherein selecting the alternate route is based at least in part on a time of day travel will occur.

10. The method of claim 1, wherein the alternate route is calculated based on route preference data stored by the at least one second networked navigation device.

11. The method of claim 10, wherein the route preference data is collected as a driver associated with the at least one second networked navigation device traverses road segments in the home locale.

12. A system for providing alternate route possibilities between a starting position and a travel destination to a first vehicle operator using a first networked navigation device from at least one second networked navigation device, the system comprising:
a routing module configured to determine a first route between the starting position and the travel destination provided by a first vehicle operator;
a transmitting module configured to transmit an alternate route request to the at least one second networked navigation device for at least a portion of the first route between the starting position and the travel destination, the at least one second networked navigation device having an assigned or determined home locale;
a receiving module configured to receive at least one alternate route from the at least one second networked navigation device;
a presentation module configured to present the determined first route and the received at least one alternate route to the operator of the first vehicle, wherein the presenting includes usage data for the at least one alternate route.

13. The system of claim 12, further comprising:
an input module configured to receive, from the first vehicle operator, a selection of one of the alternate routes;
a memory module configured to store the selected alternate route; and
a forwarding module configured to provide the stored route to another networked navigation device requesting travel routes in the proximity of the starting position and the travel destination.

14. The system of claim 12, wherein the usage data provides the first vehicle operator with a comparative gauge for selecting one of the at least one alternate routes instead of the first route.

15. The system of claim 12, wherein the transmitting module is further configured for connecting by a peer-to-peer communication.

16. The system of claim 12, further comprising:
a selection module configured to automatically select an alternate route based on the usage data.

17. The system of claim 16, wherein selecting the alternate route is based at least in part on a frequency of use of the alternate route by a second vehicle operator.

18. The system of claim 16, wherein selecting the alternate route is based at least in part on a time of day travel will occur.

19. An article of manufacture for providing alternate route possibilities between a starting position and a travel destination to a first vehicle operator using a first networked navigation device from at least one second networked navigation device, the article of manufacture comprising a computer-readable medium holding computer-executable instructions for performing a method comprising:
determining a first route between the starting position and the travel destination;
transmitting an alternate route request to the at least one second networked navigation device for at least a portion of the first route between the starting position and the travel destination, the at least one second networked navigation device having an assigned or determined home locale;
receiving at least one alternate route from the at least one second networked navigation device; and
presenting the determined first route and the received at least one alternate route to the first vehicle operator, wherein the presenting includes usage data for the at least one alternate route.

20. The article of manufacture of claim 19, further comprising:
receiving, from the first vehicle operator, a selection of one of the at least one alternate routes;
storing the selected alternate route; and
providing the stored route to another networked navigation device requesting travel routes in the proximity of the starting position and the travel destination.

21. The article of manufacture of claim 19, wherein the usage data provides the first vehicle operator with a comparative gauge for selecting one of the at least one alternate routes instead of the first route.

22. The article of manufacture of claim 19, wherein the first networked navigation device and the second networked navigation device are connected by a peer-to-peer communication.

23. The article of manufacture of claim 19, further comprising automatically selecting an alternate route based on the usage data.

* * * * *

UNITED STATES PATENT AND TRADEMARK OFFICE
CERTIFICATE OF CORRECTION

PATENT NO.        : 7,881,861 B2
APPLICATION NO.   : 12/200096
DATED             : February 1, 2011
INVENTOR(S)       : Kravets et al.

It is certified that error appears in the above-identified patent and that said Letters Patent is hereby corrected as shown below:

On Page 2, in Item (56), under "OTHER PUBLICATIONS", in Column 2, Line 3,
delete "Infrastructire" and insert -- Infrastructure --, therefor.

In the Specifications:

In Column 8, Line 3, delete "and/ore" and insert -- and/or --, therefor.

Signed and Sealed this
Seventeenth Day of April, 2012

David J. Kappos
*Director of the United States Patent and Trademark Office*